United States Patent [19]

Sibeud

[11] Patent Number: 4,532,493
[45] Date of Patent: Jul. 30, 1985

[54] DEVICE FOR DETECTING UNDERINFLATION OF A TIRE AND FOR MEASURING THE KINETIC STATE OF A VEHICLE WHEEL AND THE VEHICLE

[75] Inventor: Jean-Paul Sibeud, Saint Symphorien d'Ozon, France

[73] Assignee: Renault Vehicules Industriels, Lyons, France

[21] Appl. No.: 572,243

[22] Filed: Jan. 20, 1984

[30] Foreign Application Priority Data

Jan. 20, 1983 [FR] France .............................. 83 00867

[51] Int. Cl.³ .......................... B60C 23/02; G01L 9/14
[52] U.S. Cl. ..................................... 340/58; 73/146.5; 73/146.8
[58] Field of Search ............... 73/146.8, 146.5, 509, 73/116, , 518; 340/58

[56] References Cited

U.S. PATENT DOCUMENTS

| 2,040,375 | 5/1936 | Guthrie | 340/58 |
| 3,832,681 | 8/1974 | Kaida et al. | 340/58 |
| 4,016,753 | 3/1977 | Willenbecher | 73/116 |
| 4,180,795 | 12/1979 | Matsuda et al. | 340/58 |
| 4,348,654 | 9/1982 | Matsuda et al. | 340/58 |

FOREIGN PATENT DOCUMENTS 2459146 6/1980 France .

Primary Examiner—Donald O. Woodiel
Attorney, Agent, or Firm—Oblon, Fisher, Spivak, McClelland & Maier

[57] ABSTRACT

Device for detecting the underinflation of a motor vehicle tire (1) serving also as a device for measuring the kinetic state of the wheel, characterized by the fact that it comprises in combination: a toothed wheel turning with the wheel (1) of the vehicle and whose electrical characteristics of at least one (6a) of the teeth (6) are modified by a pressure drop in one of the tires, an electromagnet (10) fixed to rotate and constituting an electromagnetic sensor in which the toothed wheel (4) generates a signal formed from successive pulses, and a computer (23) which computes the values of the successive periods, and which interprets their variation as an acceleration or deceleration or else as a state of underinflation of the tire according to the behavior of this variation.

6 Claims, 7 Drawing Figures

DEVICE FOR DETECTING UNDERINFLATION OF A TIRE AND FOR MEASURING THE KINETIC STATE OF A VEHICLE WHEEL AND THE VEHICLE

BACKGROUND OF THE INVENTION

1. Field of the Invention

The invention relates to devices for detecting the underinflation of a tire of a motor vehicle while it is traveling, of the type comprising a first electric circuit mounted on the wheel so as to turn with it near a second nonrotating electric circuit mounted near the wheel so that the first circuit induces in the second circuit a magnetic reaction flux established or cancelled by the action of a pressure sensitive device and by the rotation of the wheel.

2. Description of the Prior Art:

Such a device, described in French patent No. 2,459,146, is already known. According to this patent, the first circuit constitutes a resonator unit mounted on the rim of the wheel, while the second circuit is an oscillator unit which is opposite the first when the wheel is in a certain angular position during its rotation. A manometric contact, closed or open in response to the inflation pressure and to the lowering of this pressure, makes it possible to modify the characteristics of the resonator by inserting, for example, a capacitor into the coil with which it is provided when the pressure becomes lower than an acceptable pressure. The oscillator unit then produces a signal which triggers a display or alarm device. This device is sensitive to the adjustment deviations of the resonance frequency and it is difficult to obtain accuracy in the detection. In addition, it has the disadvantage of being placed in a location particularly exposed to the attacks of the environment.

Moreover, in another field, wheel speed sensor devices such as the one described in French patent No. 2,275,775 are known. This latter device comprises a phonic wheel consisting of a crown which itself comprising interruptions and which is mounted to rotate near an electromagnetic detector mounted on a nonrevolving part of the vehicle so that during the rotations of the phonic wheel, the solid parts and the interrupted parts defining teeth pass alternately before the detector. Consequently, the reluctance of the magnetic circuit of the detector varies and a signal formed by succesive pulses is delivered by the coil of the detector, then sent to an electronic device which measures the frequency of it and converts it into the speed of the vehicle. This device provides no indication of the state of inflation of the tire carried by the wheel.

SUMMARY OF THE INVENTION

Accordingly, one object of the invention is to provide a device for detecting underinflation of a tire which eliminates the above drawbacks, i.e., which is simple and sturdy, easy to maintain and with a great reliability for detection, and which further assures the measurement of the kinetic state of the vehicle wheel by using the same elements.

The above object is achieved in the present invention which consists essentially of a toothed wheel fastened on the wheel of the vehicle and whose teeth are made with a nonmagnetic material that conducts electricity, except for one which is made with a nonconductive material carrying a conductive coil.

One or more pressure contacts are fastened on the single wheel or twin wheels of the vehicle in series between them and with said coil, and mounted so that the circuit thus made it closed when the air pressure prevailing in the tire or tires and acting on these pressure contacts is greater than a given value.

A conductive wire is fastened on the wheel, and connects the pressure contact or contacts and the coil of the toothed wheel. The electrical return is accomplished through grounding.

A magnetic circuit is fastened on a stationary part of the wheel solid with the frame of the vehicle and in whose gap the teeth of the toothed wheel pass turning with the wheel of the vehicle. This magnetic circuit has an electric coil to constitute an electromagnet.

An electronic computer which utilizes a microprocessor is fastened on the frame or in the cab of the vehicle. The computer is connected electrically to the coil of the electromagnet and arranged so as to detect the successive influences of the passage of the teeth in the gap of the electromagnet, to determine the successive periods that separate two consecutive passages and to interpret the relative variations of each of these periods in relation to the preceding one or ones as a deceleration or an acceleration, if this relative variation remains within narrow limits and depending on whether an increase or a reduction of the period is involved. On the other hand if it is judged to be an underinflation of the tire of the wheel under consideration if the relative variation is very large and causes the value of the period to pass approximately from single to double, then from double to half, thus indicating the passage of the tooth carrying the coil and of the opening of the circuit of this coil by the pressure contact or contacts.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The invention is applied equally to single wheels and to twin wheels as in the example shown. The rim of the wheel, or each of rims 1 of the two twin wheels, is connected respectively to a pressure contact 2 of usual type, optionally by a network of piping 3 for connection and inflation. These pressure contacts are established and adjusted so that they close an electric contact when the pressure is greater than or equal to a minimum pressure for safety.

Figure 2:
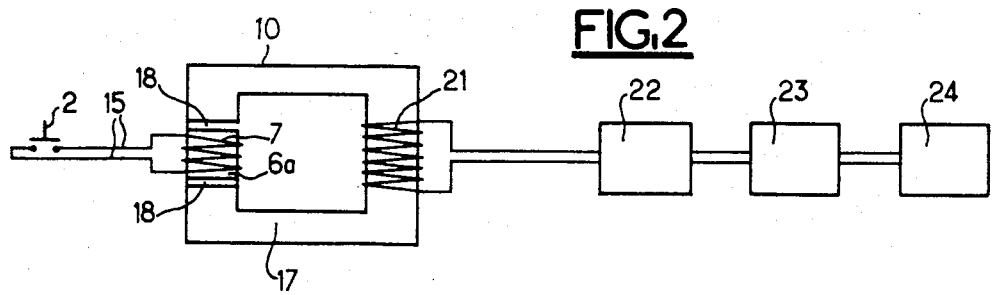
FIG. 2 is the electrical schematic diagram.

Moreover, the invention provides a phonic wheel 4 which is mounted to turn with hub 5 of the wheel, just as pressure contacts 2. This wheel comprises a certain number of regularly spaced teeth 6 of a nonmagnetic conductive material, except for one tooth 6a which is not only nonmagnetic, but also insulating and comprises a coil 7 as shown in FIG. 2 with an input 8 and an output 9 and which, when input 8 and output 9 are short-circuited, is able to induce in the sensing electromagnet 10 an electromagnetic force that is practically no different from the one induced by the passage of normal teeth 6.

According to the invention, this short-circuiting of terminals 8 and 9 of coil 7 is provided by pressure contact or contacts 2 which are mounted in a closed circuit with this coil and in series between them if there are several of them. As is customary in automobile electrical apparatus, one of the two connections connecting the single pressure contact to the two terminals of coil 7 in the case of a single wheel, or else one of three connections connecting the two pressure contacts 2 and coil 7 in series and in a closed circuit can be made by grounding of the wheel. For example, if the two pressure contacts 2 are themselves designed with a grounded terminal, it is enough to use two conductors to connect respectively the single output terminal of each of pressure contacts 2 to one of terminals 8 and 9 of coil 7.

Figure 1:
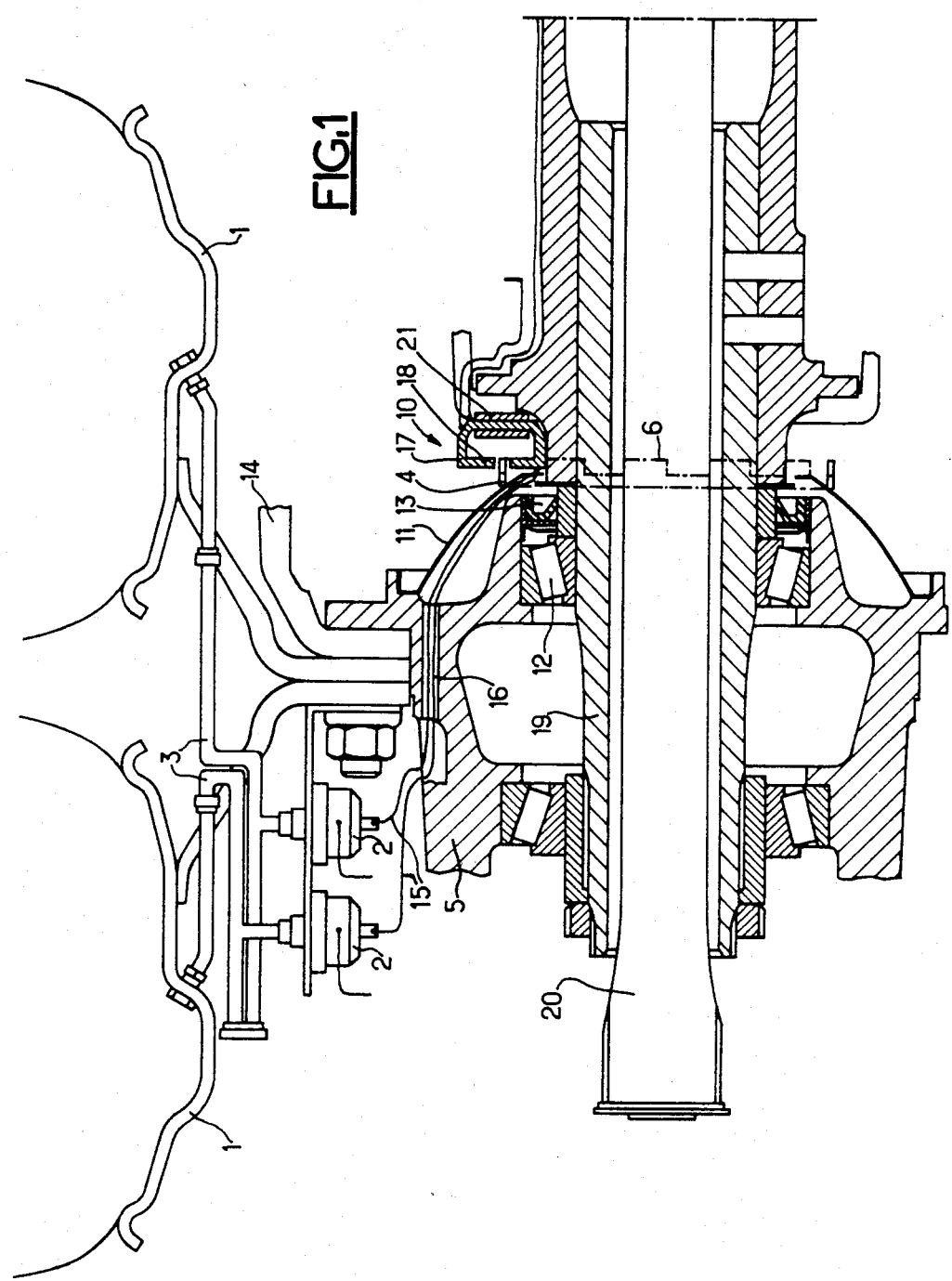
FIG. 1 is a partial section along the axis of the wheel.
Figure 3:
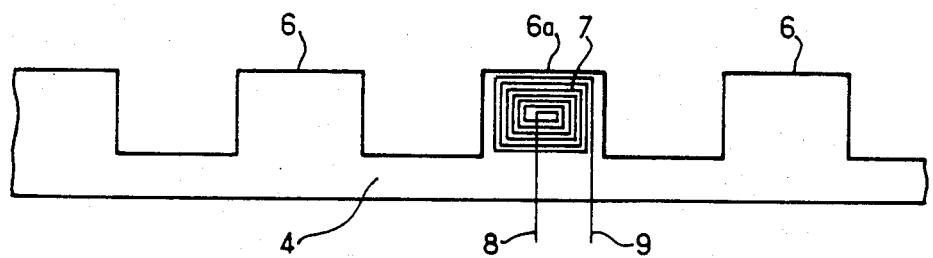
FIG. 3 is partial view developed from the toothed wheel.

The phonic wheel can advantageously be made with a printed circuit, with a single face or preferably, with a double face, whose conductive layer (or each conductive layer) is left intact to constitute normal teeth 6, and is formed in a spiral path with a single or double face to constitute coil 7. Moreover, this phonic wheel can have a flat shape, but for a practical reason for mounting and removing the wheel, it is preferable to give it a cylindrical configuration as in the example represented in FIGS. 1 and 3 by making the printed circuit in the shape of a rectilinear rack which is rolled along a cylinder and fastened on one of the revolving elements.

In the case of a heavy weight, there is generally provided a protective bowl 11 surrounding the inner bearing 12 which prevents the leaking of lubrication which could possibly escape from the antileak joint 13 from dirtying the brake drum 14. In this case it is fully recommended to fasten by any suitable means the cylindrical crown 4 directly onto this bowl 11. On the other hand, in the case of a touring car, this bowl is not generally provided and it is then possible to house cylindrical crown 4 directly inside the bore of hub 5 in which bearing 12 and antileak joint 13 are housed, by optionally extending this bore the necessary length.

Of course, the electric wires mentioned above, and shown by 15 in FIG. 1, penetrate inside the hub through an appropriate opening 16 and are returned to coil 7 of tooth 6a by following bowl 11, the entire group of these elements being mounted to turn with the wheels.

On the other hand, electromagnet 10 is mounted on a stationary part, i.e., not turning with the wheels, this stationary part being, however, most often a nonsuspended weight which is solid with the suspended frame of the vehicle. However, this is accomplished through a nonrigid connection.

Electromagnet 10 includes a magnetic circuit 17 almost closed except for a slight gap 18 just sufficient to allow the passage of teeth 6. Particularly, in the case where the phonic wheel 4 has a cylindrical configuration, gap 18 is limited by planes parallel to the axis of the wheel, which makes possible the axial introduction and removal of the phonic wheel in this gap at this same time as the axial introduction or removal of hub 5 of the wheel on axle 19, through which drive shaft 20 passes.

In addition to this magnetic circuit 17, electromagnet 10 includes an electric coil 21 which makes it possible to magnetize the electromagnet. A polarization current supplied by a generator 22 with great internal impedance is passed through coil 21 of the electromagnet. This polarization current which passes through coil 21 creates a magnetic field in gap 18 in which teeth 6 and 6a pass when the wheel turns. Then, eddy currents pass through these teeth and, in turn, induce an electromotive force in coil 21 by virtue of Lenz's law according to which the effect is opposite in sign to the cause.

Figure 4:
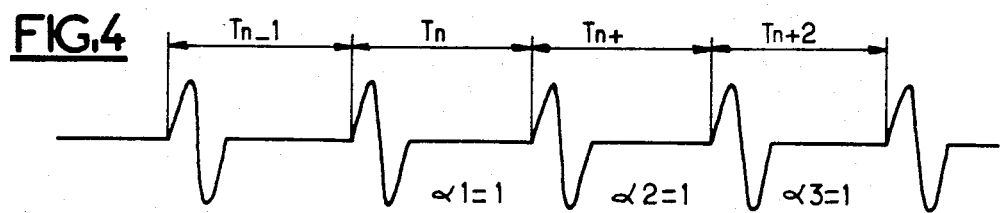
FIGS. 4 and 5 represent the curves as a function of the time of the signals delivered by the stationary part under the influence of the rotation of the revolving element, respectively when the pressure of the tires is correct and incorrect.
Figure 5:
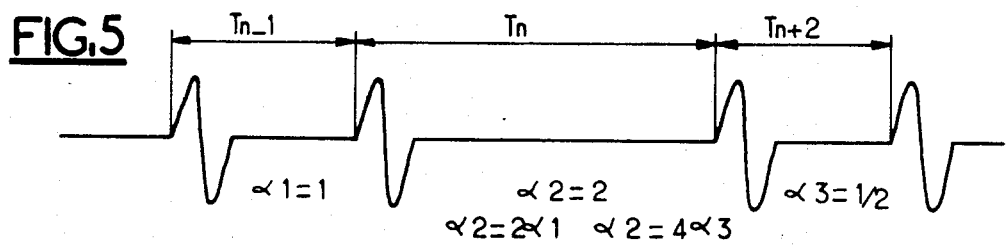

FIG. 4 shows the form of successive pulses at the terminals of coil 21 under normal conditions, and in FIG. 5 the form of these pulses in the vicinity of the passage of special tooth 6a and when the pressure contact has opened the circuit.

Under normal conditions, i.e., when the pressure is correct in the tire or tires and, consequently, when the circuit of coil 7 is closed, the successive periods Tn are approximately constant, or slightly increased when the wheel is slowing down, or further slightly decreasing when the wheel is accelerating. On the other hand, when the pressure is insufficient, a period Tn of approximately a double duration of the average value of the other pulses is periodically exhibited.

This observation is used by the apparatus of the invention for detecting at the same time the kinetic state of the wheel (speed and acceleration) and the inflation state of the tire or tires, by using a computer 23 utilizing a microprocessor which measures the successive periods Tn in a standard way, i.e., by counting signals coming from a time base or clock between two successive gate pulses.

This computer continuously computes the arithmetic average of a certain number of periods and for each new period it updates, if necessary, the new value of the average, and computes the ratio $an$ between the present value Tn of the period and the preceding value $Tn-1$. It then interprets the variation of $an$ out of three successive values, by noting that if the values $an$ are constant, it can be concluded that there is no underinflation and that the speed is constant. This speed can be computed accurately as a function of the average value of Tn, of the number of teeth of phonic wheel 4 and of the development of the wheel of the vehicle.

If, on the other hand, the successive values $an$ vary, and if these factors are close to the unity an acceleration is deduced in the case where this value is less than 1, and a decelaration is deduced in the case where this value is greater than 1. The computer can then compute as before the average speed and can further compute the value of the acceleration or the deceleration as a function of these parameters. If, on the other hand, the value of $\alpha$ suddenly goes from value near unity to an approximately double value, it is then extremely probable that an underinflation is invloved rather than a sudden deceleration. However, to remove the doubt, there are compared according to the flowchart of FIG. 6a and 6b not two, but three successive values of $$a1 = Tn/Tn-1$$

$$a2 = Tn+1/Tn$$

$$a3 = Tn+2/Tn+1$$

and if there is at the same time:

$\alpha 2 = 2\alpha 1$ and $2 = 4\alpha 3$ and this several times (p times) in succession at a rate of once per revolution of the wheel, computer 23 can conclude there is an underinflation and trigger an alarm or display system 24 corresponding to the wheel under consideration, the computer scanning, of course, the various wheels successively.

Figure 6A:
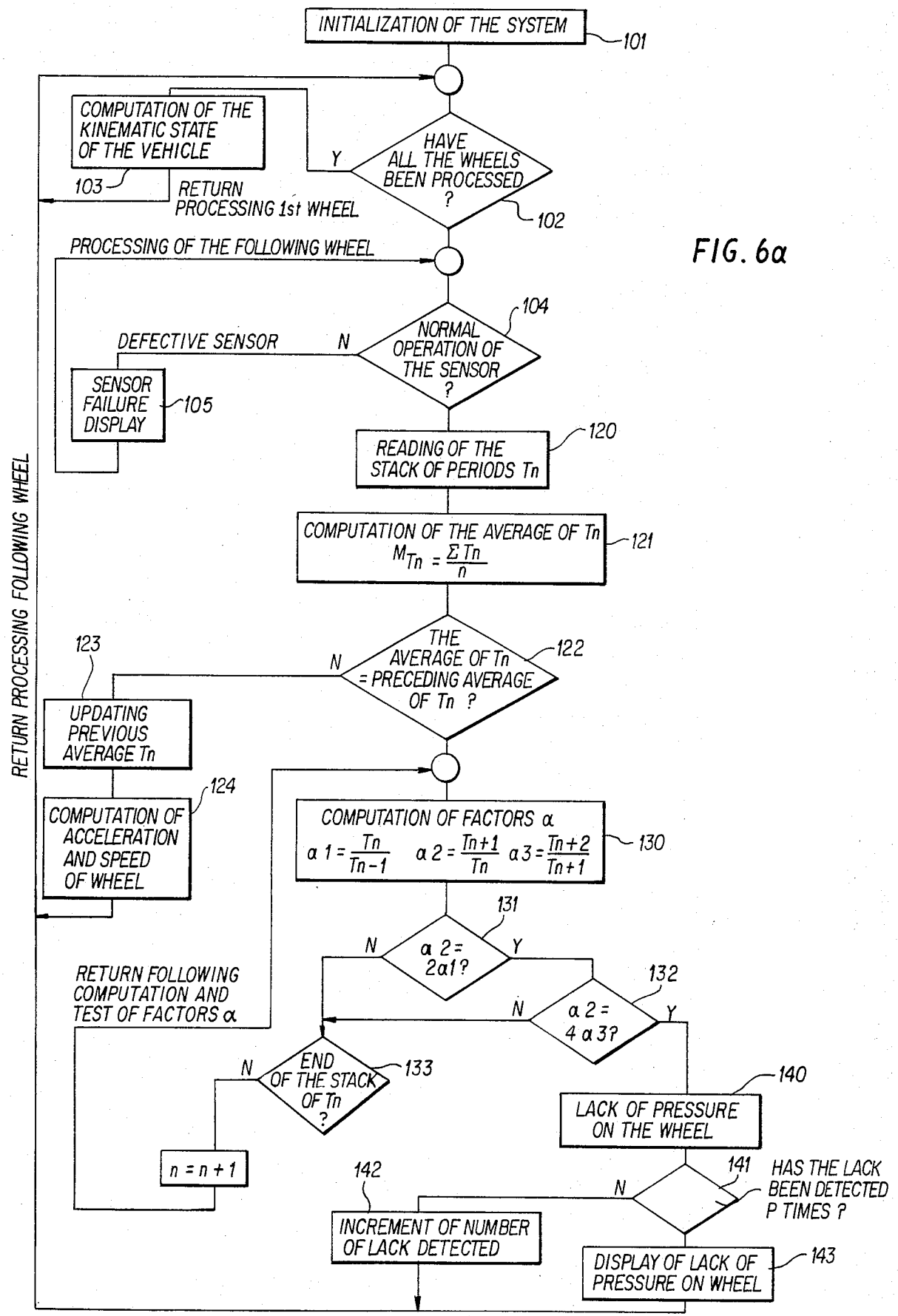
FIGS. 6a and 6b represents the logic diagram of processing by the microprocessor.
Figure 6B:
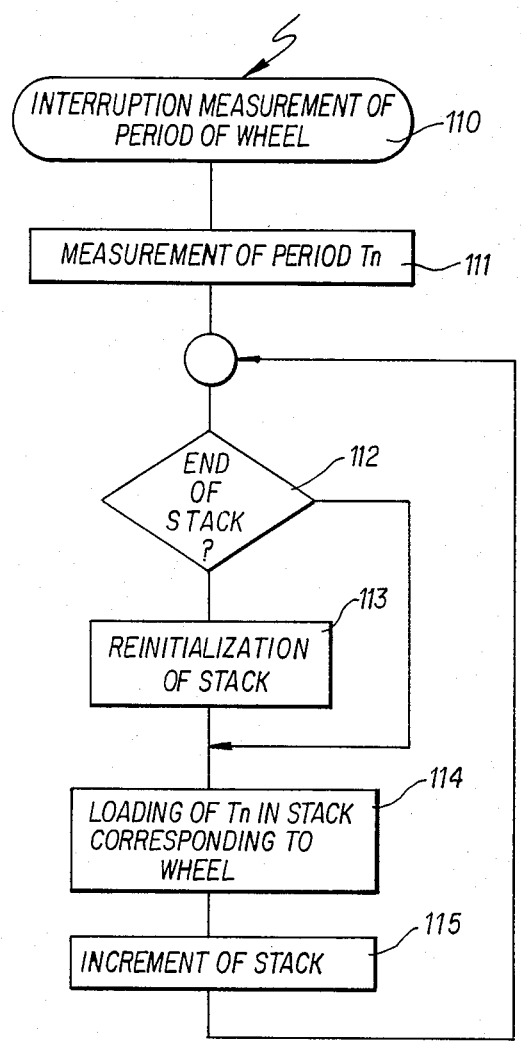

The flow chart of figure 6a of FIG. 6a details the steps taken by the computer which have been outlined above. The blocks 101-105 detail the systems initialization and the detection of the processing of each of the wheels as well as the normal operation of the sensor. The blocks 121 to 125 detail reading of the periods Tn and the computation of the average values. The computation of the the factors $\alpha$ shown above are accomplished through the items 130 through 133 and lastly the detection of the lack of air pressure for each of the specific wheels is itemized through the blocks 141-143. The FIG. 6b illustrates the blocks necessary to provide the periods Tn as shown by the items 110-115.

To do this, the computer has for each wheel a period counter and a stack associated with generator 22 corresponding to this wheel. Each interruption signal coming from this generator produces the computation of Tn and the loading of the stack which operates in a loop FIG. 6b with a number of memory positions corresponding, preferably, to the number of teeth 6, 6a of phonic wheels 4. The processor itself is unique and scans in its cycle the various stacks corresponding to the wheels, to check the operation of the sensors, to check the state of inflation and to determine the kinetic state of the various wheels.

It is seen that simply and strictly linear computations based on counts, divisions and storages make it possible to determine at the same time the kinetic state of the various wheels of the vehicle, the kinetic state of the vehicle itself and the state of inflation of these various wheels. The programming of the microprocessor intended to perform the various operations defined on the flow chart of FIG. 6a and 6b is within the scope of one of oridinary skill in the art.

I claim:

1. A device for detecting the underinflaion of the tire of a motor vehicle wheel and for measuring the kinetic state of the wheel and of the vehicle from the kinetic state of several wheels, comprising:
    electromagnetic sensor means fixed to said vehicle;
    circuit means fixed to said wheel and rotating with said wheel wherein said circuit means periodically passes in front of said sensor means during rotation of said vehicle wheel;
    a toothed wheel which rotates with said vehicle wheel and which contains a plurality of teeth with at least one of said teeth being constructed so that the electro-mechanical characteristics of said at least one tooth is modified by pressure drop in one of said tires of said motor vehicle wheels, wherein said toothed wheel generates a signal formed of successive pulses whose period is modified by the variation and the electrical characteristics caused by the pressure drop in one of said tires and by the speed and acceleration conditions of the rotation of said wheel and wherein said electromagnetic sensor detects said tooth wheel generated signal; and
    means for computing the values of successive periods of said pulses and for computing the relative variation of said values from several periods wherein said means for computing outputs a signal indicating one of an acceleration, a deceleration and the state of underinflation of one of said tires according to said variation of said value from several periods.

2. A device according to claim 1 wherein said at least one tooth of said tooth wheel includes a coil fixed on an insulating material which forms a circuit closed by a pressure contact when the pressure in said tire is within a predetermined range and which is open when said pressure is below said predetermined range and wherein the remainder of said teeth each comprise nonmagnetic material which conduct electricity.

3. The device according to claim 2 wherein said tooth wheel is constituted by a printed circuit with one of single and a double face wherein said remaining teeth is made up of solid conductive portions and wherein said at least one tooth carrying said coil utilizes a printing circuit path having a spiral configuration.

4. The device according to claim 3 wherein said printed circuit is shaped as a rectilinear rack coiled according to cylindrical configuration in order to facilitate the axial mounting and removal of said tooth wheel from said vehicle wheel by insertion of said teeth into a gap of the electromagnet which gap is parallel to the axis of said vehicle wheel.

5. The device according to claim 1 wherein said electromagnetic sensor comprises and electromagnet with a magnetic circuit means which is closed except for a narrow gap and wherein said teeth of said toothed wheel pass through said gap when said toothed wheel is rotated.

6. The device according to this claim 1 wherein said computer means calculates a first, second and third successive values based upon the ratio between said period and a preceding period and wherein said computer means provides and indication of underinflation of said wheel under consideration when said second successive value is twice said first successive value and said second successive value is four times the value of said third successive value and wherein when said second value is not equal to twice said first successive value and four times said third successive value, said computer means determines said kinetic state of said wheel and said kinetic state of said vehicle based upon several wheels of said vehicle.

* * * * *